United States Patent
Bannert et al.

(10) Patent No.: US 10,586,139 B2
(45) Date of Patent: Mar. 10, 2020

(54) PRODUCTION METHOD FOR PORTABLE DATA CARRIERS

(71) Applicants: GIESECKE+DEVRIENT MOBILE SECURITY GMBH, Munich (DE); BIELOMATIC LEUZE GMBH + CO KG, Neuffen (DE)

(72) Inventors: Stefan Bannert, Munich (DE); Peter Kaufmann, Munich (DE); Lucas Perlitz, Munich (DE); Thomas Tarantino, Laufen (DE); Robert Griesmeier, OT Heufeldmuhle (DE); Tatjana Mosthof, Munich (DE); Cordula Regensburger, Utting (DE); Martin Bohn, Reutlingen (DE)

(73) Assignees: GIESECKE+DEVRIENT MOBILE SECURITY GMBH, Munich (DE); BIELOMATIC LEUZE GMBH + CO KG, Neuffen (DE)

( * ) Notice: Subject to any disclaimer, the term of this patent is extended or adjusted under 35 U.S.C. 154(b) by 142 days.

(21) Appl. No.: 15/800,486

(22) Filed: Nov. 1, 2017

(65) Prior Publication Data
US 2018/0053081 A1    Feb. 22, 2018

Related U.S. Application Data

(62) Division of application No. 14/897,785, filed as application No. PCT/EP2014/001359 on May 20, 2014, now Pat. No. 10,192,156.

(30) Foreign Application Priority Data

Jun. 14, 2013   (DE) .................. 10 2013 009 971

(51) Int. Cl.
G06K 19/00   (2006.01)
G06K 19/07   (2006.01)
G06K 19/077  (2006.01)

(52) U.S. Cl.
CPC ....... *G06K 19/0723* (2013.01); *G06K 19/077* (2013.01); *G06K 19/07718* (2013.01)

(58) Field of Classification Search
CPC .................................. G06K 19/0723
(Continued)

(56) References Cited

U.S. PATENT DOCUMENTS 5,888,624 A   3/1999   Haghiri et al.
7,842,153 B2  11/2010  Chien et al.
(Continued)

FOREIGN PATENT DOCUMENTS

CN    1144571 A      3/1997
CN    101248447 A    8/2008
(Continued)

OTHER PUBLICATIONS

International Preliminary Report on Patentability from PCT Application No. PCT/EP2014/001359, dated Dec. 15, 2015.
(Continued)

*Primary Examiner* — Brent T O'Hern
(74) *Attorney, Agent, or Firm* — Workman Nydegger

(57) ABSTRACT

A method for producing a portable data carrier by means of a continuous production method, in particular a roll-to-roll method, includes the step of processing at least one foil in the form of roll goods. The unrolled foil is coated with an adhesive at least partially on at least one side. Subsequently, the foil is scored along at least one fold edge on at least one side of the foil. The foil is then folded along the scored fold edge in exact register and bonded. For this purpose the foil is folded in the direction of the side that is coated with
(Continued)

adhesive, wherein the side coated with adhesive is arranged on the opposite side of the foil which has at least one scored fold edge, along which the folding is effected. Finally, data carriers are punched out in exact register from the at least one folded and bonded foil.

19 Claims, 10 Drawing Sheets

(58) Field of Classification Search
USPC .................................................... 428/124
See application file for complete search history.

(56) References Cited

U.S. PATENT DOCUMENTS

| | | | |
|---|---|---|---|
| 10,275,701 B2 | 4/2019 | Tarantino et al. |
| 2004/0056476 A1 | 3/2004 | Behnen |
| 2007/0039687 A1 | 2/2007 | Hamilton et al. |
| 2007/0283556 A1 | 12/2007 | Wehr |
| 2012/0066893 A1 | 3/2012 | Tarantino et al. |
| 2012/0319393 A1 | 12/2012 | Fischer |
| 2016/0371575 A1 | 12/2016 | Bannert et al. |

FOREIGN PATENT DOCUMENTS

| | | | |
|---|---|---|---|
| CN | 102449642 A | 5/2012 | |
| DE | 19942932 A1 | 3/2001 | |
| DE | 19942932 C2 | 1/2002 | |
| DE | 10042932 A1 * | 3/2002 | ......... H01L 21/3212 |
| DE | 10233927 A1 | 2/2004 | |
| DE | 102008053096 A1 | 4/2010 | |
| WO | 03000505 A1 | 1/2003 | |

OTHER PUBLICATIONS

International Search Report from PCT Application No. PCT/EP2014/001359, dated Jul. 22, 2014.
Chinese Office Action from CN Application No. 201480033422.7, dated Jun. 12, 2017.
Office Action from corresponding Chinese Application No. 2014800334227, dated Jun. 12, 2017.
Office Action from corresponding Chinese Application No. 2014800334227, dated Jan. 19, 2018.

* cited by examiner

PRODUCTION METHOD FOR PORTABLE DATA CARRIERS

BACKGROUND

The invention describes a production method for portable data carriers.

Portable data carriers, such as e.g. SIM cards, credit cards, health cards, identity cards, etc. are normally produced by an injection-molding method or lamination method.

SIM cards are as a rule produced by an injection-molding method, which is very expensive and means high material expenditure. The high expenditure results from the circumstance that SIM cards are frequently broken out from cards in the ID-1 format. After the SIM card is broken out, the largest part of the ID-1 card is consequently discarded. Moreover, the production of credit cards for example is quasi a single-part production. The quasi single-part production results in a sequential manual processing, which is very time-consuming and cost-intensive.

During the production of portable data carriers by means of a lamination method the components of the data carriers are subjected to great stress due to high temperatures, e.g. of 120 to 160 degrees Celsius, and high pressures, e.g. of 100 to 250 bar. This frequently leads to a damage of the components such as e.g. antenna coils, chips. Components that are sensitive to such stresses, such as e.g. display elements, consequently cannot be processed by means of a lamination method. Further, the lamination method takes a relatively long time until the various foil layers are permanently bonded with each other under pressure and temperature.

SUMMARY

Proceeding from the state of the art, it is the object of the invention to find a solution that avoids the above-described disadvantages.

In order to achieve this object, the invention discloses a method for producing a portable data carrier by means of a continuous production method. As first steps, at least one foil is made available in the form of roll goods, and at least one first foil is unrolled for the method. The at least one first foil is coated with an adhesive at least partially on at least one side. According to the invention, the adhesive can be e.g. liquid or pasty. Further, the adhesive can also be processed e.g. in the form of a double-sided adhesive tape or in any other suitable form. Subsequently, at least the first foil is scored on at least one side along at least one fold edge. After the scoring, at least the first foil is folded in exact register along at least one fold edge and bonded. In so doing, the foil is folded such that the foil is folded in the direction of the side that is coated with adhesive. The side coated with adhesive is arranged on the opposite side of the foil having at least one scored fold edge along which the folding is effected. The present solution is a very fast production method, since no long production times are required like in the case of the lamination method, since the foil is adhesively bonded. The pressure and temperature stress for the at least one foil to be processed is likewise substantially lower than in the lamination method, since here heat is transferred to the foil only for a very short time during the application of the for example liquid adhesive, wherein the adhesive cools very fast upon contact with the foil, such that the heat can no longer impair e.g. the at least one foil or electronic components. A particular advantage of the invention is that a continuous production is made possible without interruptions, meaning a high production speed and large numbers of pieces per hour in connection therewith. With the present method it is possible to produce for example 800 cards per minute in a very cost-effective and fast fashion. This high speed is achieved by an inline production with roll feeding. The method can have a modular structure, thus making flexible production possible. The produced cards have a high elasticity and consequently lower wear caused by bending loads. A folding in exact register of the processed foil is made possible by the invention. Further, the folding according to the invention compensates tensions within the card, thus leading to a more stable product. The method at low temperatures and pressures according to the invention makes it possible to process sensitive components. As foils, cost-efficient standard materials can be utilized which do not need to be suitable for lamination. By a combination according to the invention of card production and e.g. digital printing, an extremely fast and flexible card production is possible without producing a printing form. This makes it possible to realize very small print runs in a short time. Further, a personalized inline card production is possible due to the e.g. digitally printed foils. Additionally, a product coding per card can be integrated in the method, thus ensuring an exact traceability of the cards. The method according to the invention is characterized by the advantages in particular for the production of SIM cards that it has high material savings, since the production can be effected directly in the SIM card format, and less waste is produced than, in comparison to the state of the art, by the production in the ID-1 format, and has a high production speed. Corresponding advantages are applicable analogously to the production of e.g. credit cards or health cards. Great potentials for economies are provided there by the invention in view of the production costs and the production time.

As an advantageous exemplary embodiment, at least one foil consists of at least one foil ply. A foil structure of several plies makes it possible to directly influence the properties of a foil, e.g. the mechanical, electrical, chemical properties. In particular the mechanical properties can thus be influenced in targeted fashion, e.g. a combination of foils can be chosen in view of a certain desired elasticity.

As a further advantageous exemplary embodiment at least one second foil is bonded in exact register with the at least first foil. The great advantage of the invention is that theoretically any number of foils can be bonded to each other in exact register. As a rule, the technical apparatus effecting the method according to the invention represents the limiting factor. It is thus made possible to bond several of the same or different foils with each other in exact register.

As a further advantageous exemplary embodiment, at least the first foil is folded around the at least second foil or the at least second foil is folded around the at least first foil. What is advantageous is that thus multilayer foil structures can be produced from different foils. There can be more than two foils that are mutually bonded and folded, e.g. three or four foils, which are mutually bonded and folded.

As a further advantageous exemplary embodiment, the adhesive is a hot-melt adhesive. An advantage of the hot-melt adhesive is that the hot-melt adhesive is melted onto the foil immediately before application and is applied to the foil in a liquid state. The adhesive cools very fast upon contact with the foil, such that any risk for components sensitive to high temperatures is ruled out.

As a further advantageous exemplary embodiment, the adhesive sets while incorporating water or moisture from the surrounding air, e.g. by means of a polycondensation reaction. This type of adhesive has proven very suitable in the tests, since it cools very fast and produces a very reliable adhesive bonding and is easy to handle. An advantageous application of the adhesive is in the production of cards, such as e.g. credit cards. In particular in the production of SIM cards it is advantageous and technically easy to realize to utilize a double-sided adhesive tape instead of an adhesive. Advantageously, the double-sided adhesive tape has an adhesive forming an adhesive connection as soon as the adhesive is subjected to pressure, a so-called pressure sensitive adhesive, abbreviated as PSA. Alternatively, the PSA can also be processed on its own, without double-sided adhesive tape.

As a further advantageous exemplary embodiment the utilized adhesive compensates uneven areas or differences in height. This property can be used very advantageously in particular when e.g. electronic components are integrated, which inherently have a very small construction height, but the difference in height of which in comparison to the surroundings can be compensated very easily by means of adhesive, in order to obtain an even surface for a further foil.

As a further advantageous embodiment at least one foil is printed. A further great advantage of the invention is that at least one foil can be printed during the production process. This can be effected e.g. by moving the at least one foil past the printer and printing it during the movement without stopping the at least one foil. Thus a very fast printing is made possible without interrupting the course of production.

As a further advantageous exemplary embodiment a front and back side design of a data carrier is printed on one side of at least one foil. An advantage of this is that at least one foil is printed on one side with both the front and the back side design of a portable data carrier, e.g. a credit card. Subsequently for example the printed foil is folded around at least one further foil forming e.g. a core of a data carrier, and bonded with the core. This makes possible e.g. to effect the printing of a foil and the production of a core for the data carrier in parallel, wherein in the end the printed foil is folded in exact register around the core as an outer side and is bonded with said core according to the invention.

As a further advantageous exemplary embodiment a digital printing method is utilized for printing. The digital printing method makes possible a very fast and flexible printing of at least one foil. The great advantage of the digital printing method is that a printing form is not required. This makes it possible to process also very small print jobs fast. As an alternative to digital printing, also a roll offset printing method or a roll screen printing method can be utilized.

As a further advantageous exemplary embodiment at least one opening is incorporated in at least one foil. This is used advantageously when for example elevations are to be compensated in order to obtain an even surface again. For this purpose, the elevation is disposed within the opening of at least one foil.

As a further advantageous exemplary embodiment the at least one opening is produced by means of a laser and/or a punch. It is an advantage of a laser or a punch, in particular a rotating punch, that either can be incorporated in the production process without any problem. The laser and the punch are well suited to continuously process foil transported past during its movement, without the course of the production having to be interrupted.

As a further advantageous exemplary embodiment at least one electronic component is arranged on at least one foil. This makes possible advantageously the production of for example chip cards with the aid of the present invention.

As a further advantageous exemplary embodiment the electronic component is a chip and/or a coil antenna and/or an ISO contact area field according to ISO 7810. This makes possible e.g. the production of contactless and/or contact-type chip cards with the aid of the present method according to the invention. Besides the mentioned electronic components all other suitable components can be made available for the production by means of a foil, e.g. display elements.

As a further advantageous exemplary embodiment at least one data carrier is punched in exact register from at least one folded and bonded foil. The great advantage of the invention is that after the production of a composite, consisting of at least one folded and bonded foil, portable data carriers can be punched out in exact register from the composite during the movement of the foil, e.g. by means of a rotating punch. What remains of the composite is for example a grid that is wound up suitably and disposed of.

As a further advantageous exemplary embodiment the continuous production method is a roll-to-roll method. The roll-to-roll method is the method offering the greatest advantages in the implementation of the present invention. At least one foil is made available in the form of roll goods. The at least one foil is unwound and processed according to the invention. After the processing, for example data carriers are punched out from the composite or the composite is wound up on a roll again for further processing steps. When the data carriers have been punched out and removed from the composite, the remaining composite, e.g. in the form of a grid, is disposed of as waste.

In order to achieve the object, the invention further discloses an apparatus for performing the above-described method for producing a portable data carrier.

In order to achieve the object, the invention further discloses a data carrier produced in accordance with the above-described method.

BRIEF DESCRIPTION OF THE DRAWINGS

In the following, exemplary embodiments of the invention will be described in detail with reference to the attached figures.

DETAILED DESCRIPTION OF VARIOUS EMBODIMENTS

Figure 1:
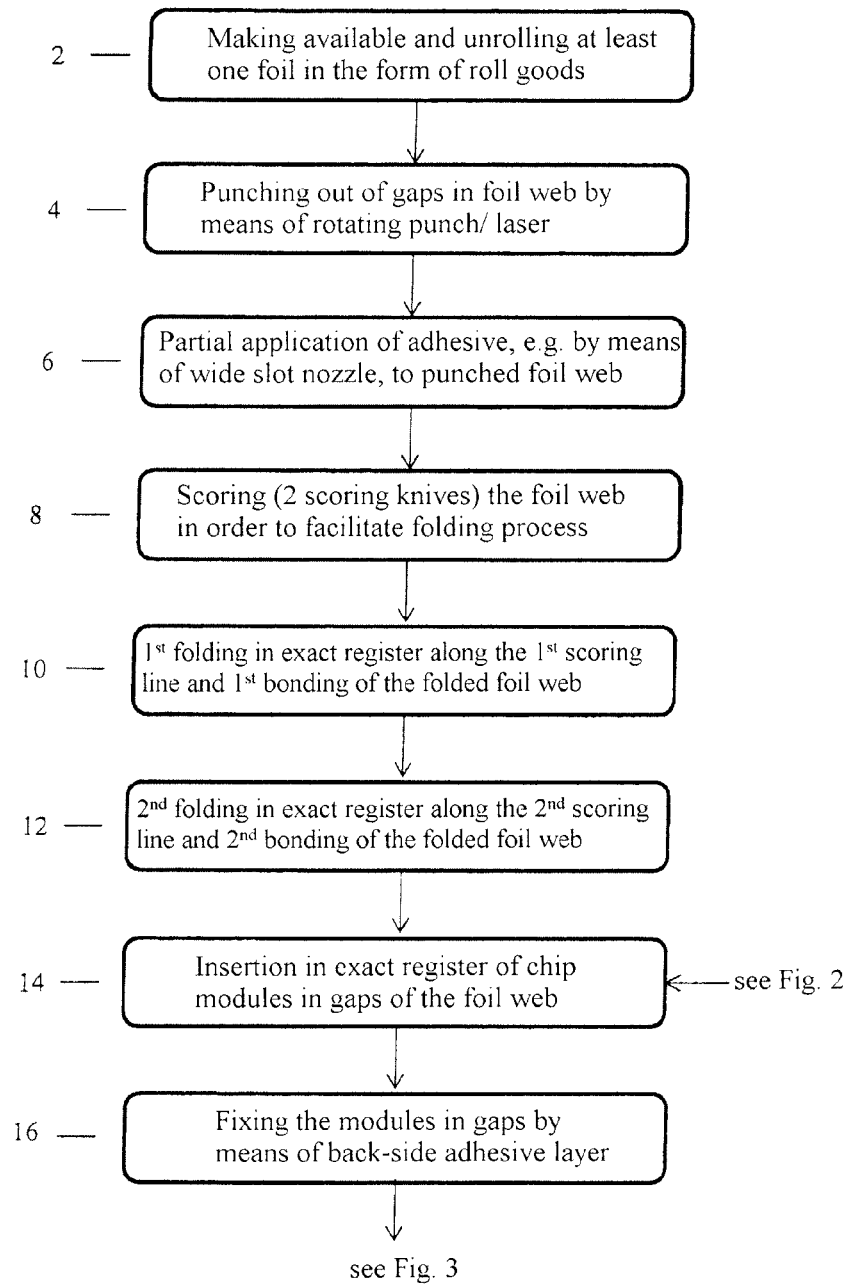
FIGS. 1 to 3 describe method steps for a first exemplary embodiment of the invention for producing a card consisting of three layers.
Figure 2:
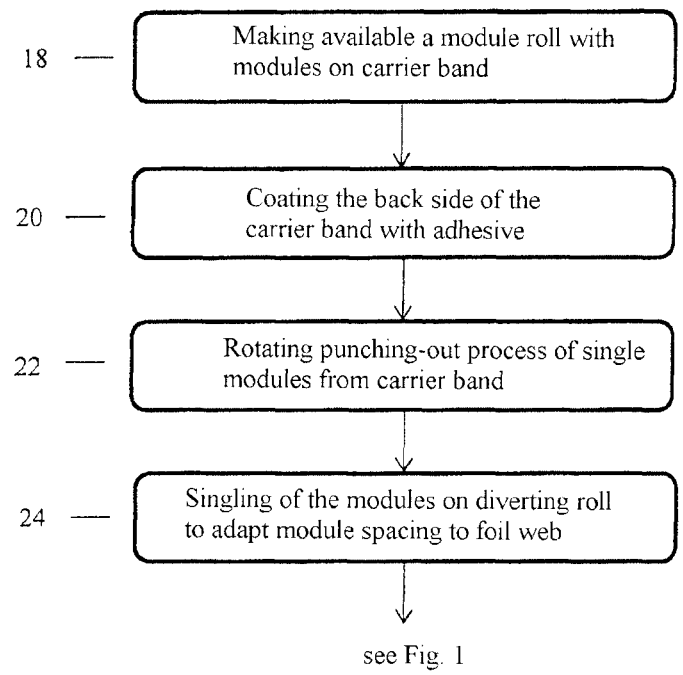
Figure 3:
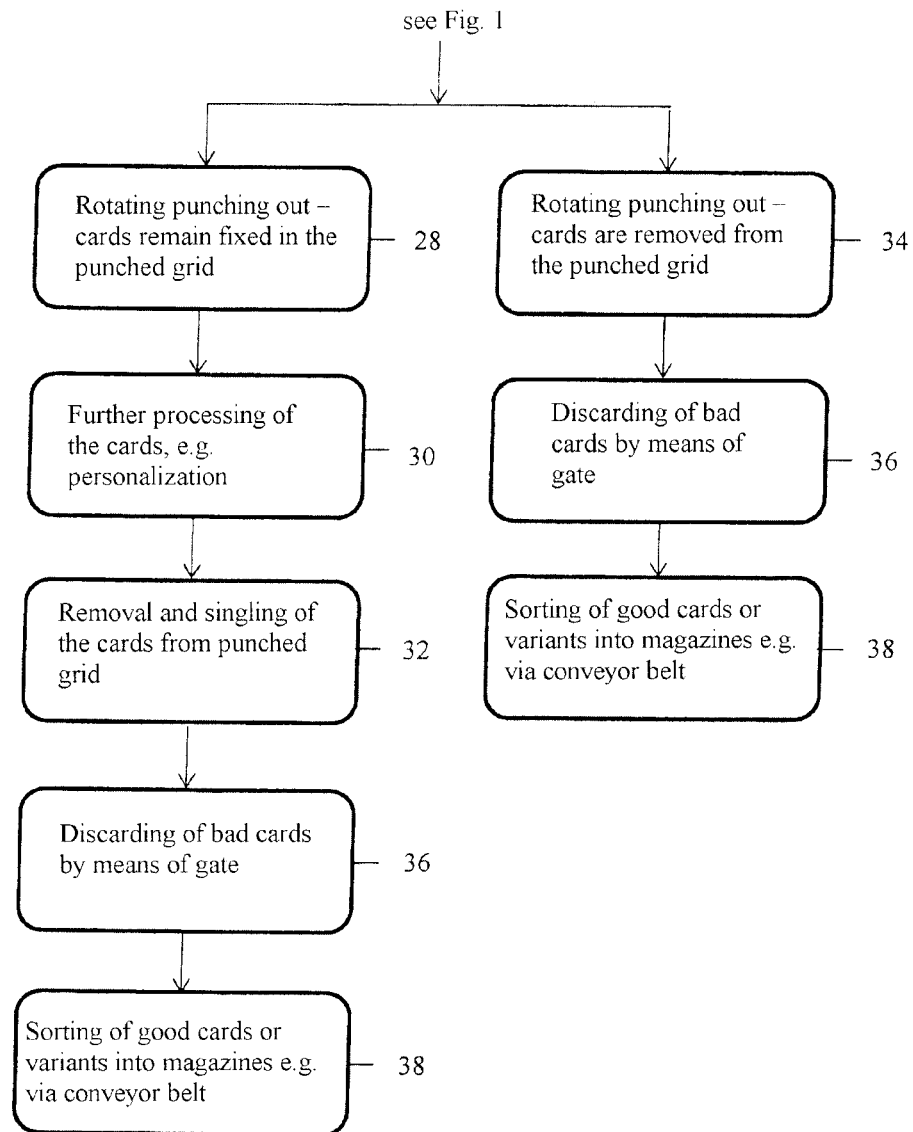

FIGS. 1 to 3 describe method steps for a first exemplary embodiment of the invention for producing a card consisting of three layers.

The production method according to the invention is a continuous production method for portable data carriers, e.g. SIM cards, credit cards, etc. For this purpose, foils are made available in the form of roll goods. The foils are unrolled and fed to the process. During the process the foils are for example moved at a speed in a range from 40 to 100 m/min. In the process, the foils are coated with adhesive, joined in exact register and folded in exact register. Individual foils are connected to form a composite, wherein the composite consists of at least one foil. From the composite data carriers are punched out in exact register. The punched out data carriers are sorted into good and bad data carriers, e.g. by means of a gate. After the sorting the data carriers are processed further, e.g. personalized or packed in magazines or cardboard boxes for further processing steps.

As base material plastic foils in the form of web material in a roll format of any type are possible, for example PVC, which is used e.g. for producing credit cards. For the production of SIM cards for example ABS plastics can be utilized. As adhesive for example a single-component, reactive hot-melt adhesive is suitable, e.g. a so-called PUR hotmelt, since the hot-melt adhesive is easy to process and its price is relatively inexpensive. For example for the production in particular of SIM cards an adhesive can be used which effects a permanent bond when subjected to pressure, e.g. a so-called pressure sensitive adhesive, abbreviated as PSA.

The data carriers produced with the method have an elastic behavior in comparison to laminated cards according to the state of the art.

The method will now be explained by the example of producing a SIM card.

Figure 4:
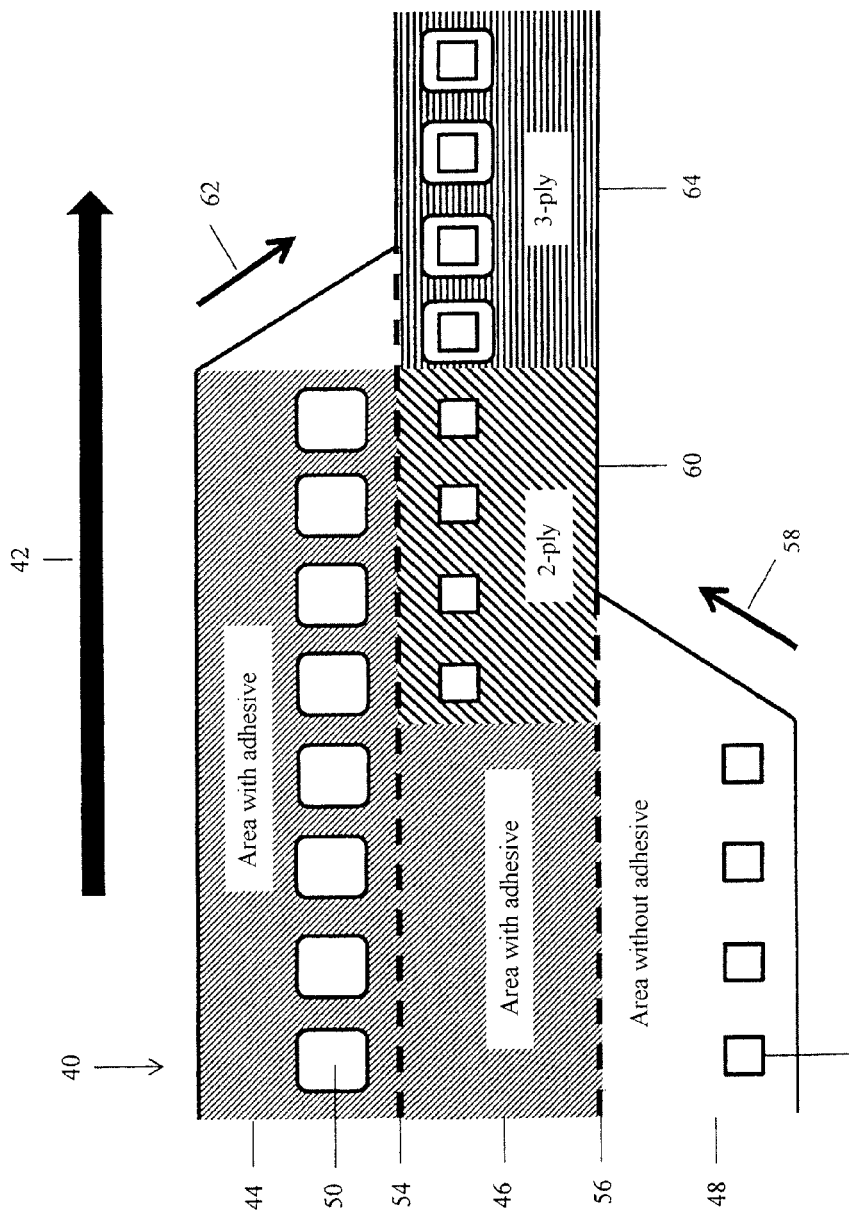
FIG. 4 shows in principle the process according to the invention during the folding of a foil with reference to a two-step folding.

At the start of the process, at least one foil is made available in the form of roll goods and is unrolled for the method, see step 2 in FIG. 1. The foil here is an opaque, i.e. light non-transmissive foil. Gaps are punched into the foil web, so that e.g. a chip module can be inserted in the place later on, see step 4. For punching out the gaps for example a rotating punch, a water jet or a laser can be utilized. FIG. 4 shows an example of a punched foil. The punching is followed by an at least partial or regional application of adhesive to the punched foil, see step 6. The application of adhesive can be effected for example by means of a wide slot nozzle. In this exemplary embodiment the punched, adhesive-coated foil is scored with two scoring knives, in order to facilitate the subsequent folding process, see step 8. The scoring lines can be recognized e.g. in FIG. 4 in the dashed lines 54 and 56. Directly after the scoring the foil is folded for the first time along the first scoring line and bonded, see step 10. After the first folding the foil has two plies in an area, wherein a punching is disposed in one foil ply. This can be recognized well for example in FIG. 4 in the area 60. For folding for example a so-called plow folder can be utilized. The first folding process is followed immediately by the second folding process. Also here, the foil is folded along the second scoring line and bonded, see step 12. The foil, which had only one ply at the start, has now become a composite consisting of three foil plies of a foil. The gaps have come to lie above each other after the folding in such a fashion that a chip module can be inserted in the thus created opening. The foil has now been sufficiently prepared for a chip module to be inserted in a gap in each case, see step 14. The production of the chip module is represented in FIG. 2.

In FIG. 2 a module roll is made available. The module roll is a foil roll on which for example chip modules are disposed. The foil roll has the function of a carrier in particular, on the surface of which optionally components are arranged, e.g. antenna coils. Alternatively, the components can also be arranged within the carrier. Other electronic components, such as e.g. an antenna coil, can also be disposed on the foil. The foil here serves as a carrier band for the modules, see step 18. As described in FIG. 1, also here a side of the carrier band, here the back side, is coated with adhesive, see step 20. The modules are punched out from the carrier band e.g. by means of a rotating punch, see step 22. The punched out, single modules are arranged on a diverting roll, in order to adapt the spacing between the modules on the diverting roll to the spacing between the gaps on the foil of FIG. 1 for the later fixation of the modules in the foil of FIG. 1, see step 24.

Now the modules can be inserted in exact register in the gaps of the foil of FIG. 1, FIG. 1, see step 14. Optionally, before inserting the modules in the gaps, an additional adhesive can be fed into the gaps, in order to securely fix the modules. The modules are fixed in the gaps by means of the adhesive layer on the back side, see step 16. For the further process, two alternatives are represented in FIG. 3.

In the first alternative cards, e.g. SIM cards, are punched out at least partially from the composite with the fixed modules, wherein the cards are not yet completely detached from the composite or the punched grid containing them, see step 28. The purpose of not completely punching out the cards is that the cards can then be further processed more easily, e.g. when the cards are personalized, than when the cards are already detached completely from the punched grid, see step 30. Only after a further processing are the cards detached completely from the punched grid and removed therefrom, see step 32, in order to sort the cards into magazines for example. After step 32 the cards are sorted into good and bad cards in step 36, and the bad cards are discarded or separated by means of e.g. a gate. Bad cards are understood as cards with production faults, which also include functional defects. The good cards, that is the cards without production faults and with full function, are sorted in step 38 e.g. according to variants and/or sorted into magazines via e.g. a conveyor belt. Production faults can be in particular faults of the shape or function of the card or of the card's design. Functional faults can be e.g. a defective chip or a defective antenna coil, which is determined e.g. by means of an electrical checking device. A design fault can be e.g. a misprint of the design, which is detected e.g. by means of image processing.

The second alternative describes in step 34 a rotating punching out and removal of the cards from the punched grid. The cards are punched out in exact register. Subsequently, the cards are further processed as already described above in steps 36 and 38.

FIG. 4 shows in principle the process according to the invention during the folding of a foil by the example of a two-step folding. A foil 40 is transported in the machine running direction 42 during the process. The foil 40 here has three areas 44, 46 and 48. The areas 44 and 48 each have several gaps 50 and 52 punched into the foil 40. The gaps 50 and 52 serve for forming a gap into which a module, e.g. a chip module, is inserted. The areas 44 and 46 are coated with adhesive. Before the folding according to the invention of the foil 40, two scoring lines 54 and 56 are scored into the foil 40, in order to facilitate the subsequent folding. First, the area 48 is folded in the direction 58 along the scoring line 56, so that the area 48 comes to lie in exact register on the adhesive-coated area 46 and is bonded with the same. The thus created area 60 consists of two plies and has the gaps 52 on its surface. Next, the area 44 is folded in exact register in the direction 62 along the scoring line 54 onto the area 60 and bonded with the same. In the area 64 a foil with three plies has been created now. The areas 44, 46 and 48 have been folded onto each other in exact register and have been mutually bonded, such that for example the gaps 50 and 52 have come to lie exactly above each other. Tensions in the created card are canceled out by the method of the invention by an odd number of foldings, e.g. simple or triple folding. Orientations which are possibly present in the at least one foil are offset by the folding according to the invention. A curvature or warpage of the product resulting therefrom is avoided thereby. In addition to the above-described method it is possible to introduce and also bond a further foil in exact register during the folding. Consequently, structures of several foil plies and adhesive layers can be realized. This is interesting in particular when gaps are required on different levels, independently of the material thickness of a foil.

Figure 5:
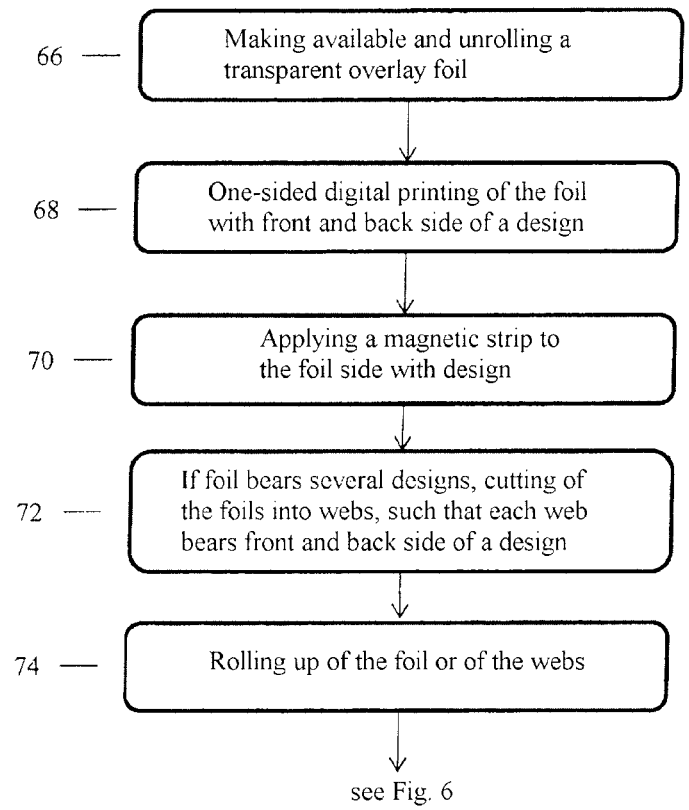
FIGS. 5 and 6 describe the method steps for a second exemplary embodiment of the method according to the invention for producing a card consisting of five layers.
Figure 6:
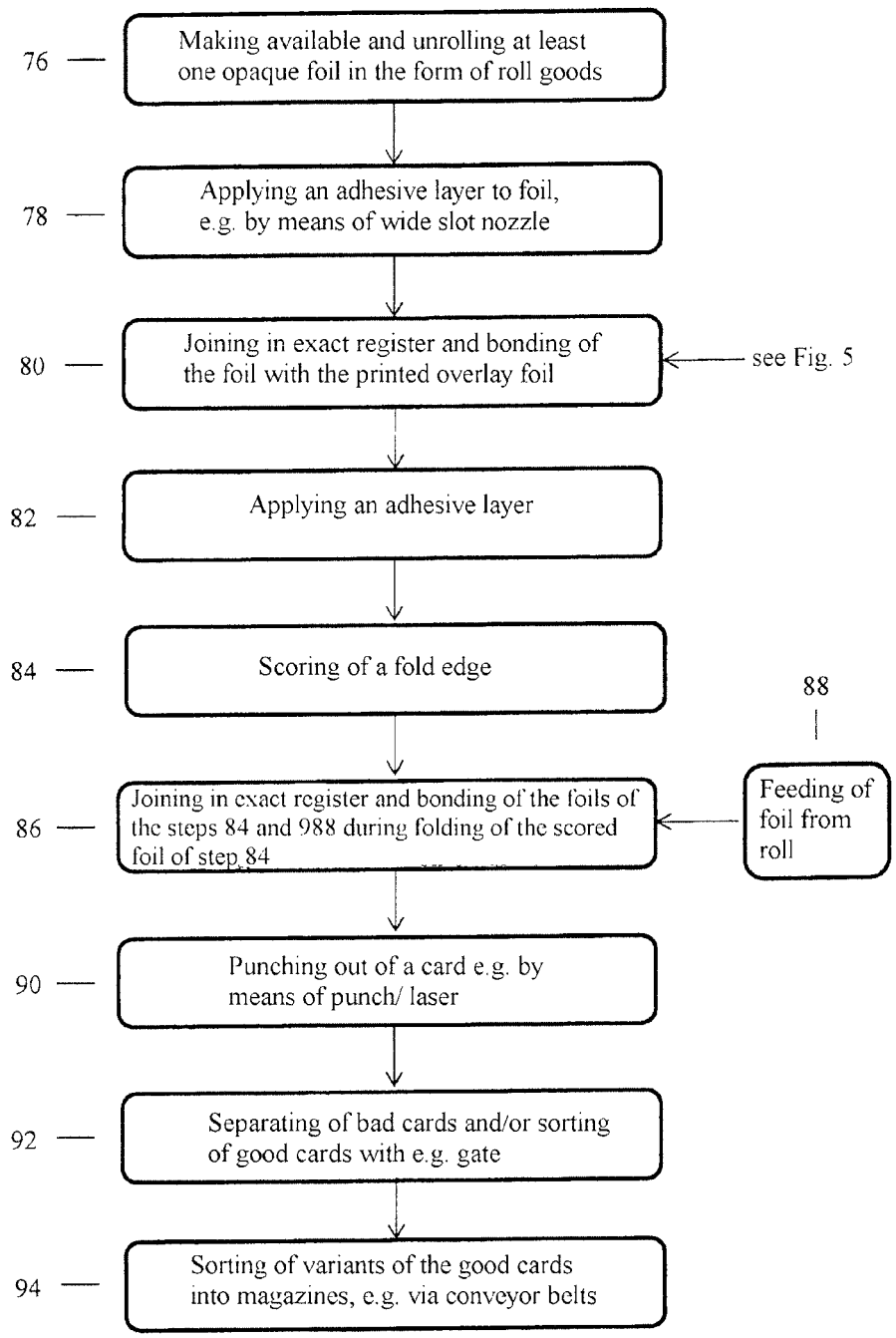

FIGS. 5 and 6 describe the method steps for a second exemplary embodiment of the method of the invention for producing a card consisting of five layers.

In FIG. 5, step 66, a transparent, i.e. light-transmissive overlay foil is made available in the form of roll goods and is unrolled for the method. The overlay foil is arranged on at least one outer side of the card. Alternatively, also an opaque overlay foil can be utilized.

On one side of the foil a design of a front and back side of a data carrier is printed by means of a digital printing method, see step 68. In principle, the foil can be printed partially or all over from the roll. Besides the digital printing method, alternatively for example printing with metallic inks or special inks in the screen printing or offset method are possible. After printing the foil, in step 70 at least one magnetic strip is applied on the side of the foil opposite that on which the design was printed. Optionally the magnetic strip can also be applied to the side on which the design was printed. The magnetic strip can be arranged on either of the outside and the inside of the card. In case that several or different designs were applied to the foil, the foil is cut into webs in step 72, such that every web bears one single design consisting of a front and a back side. After the cutting the foil or possibly the webs are rolled up again in step 74, in order to further process them later. Alternatively to step 74 the foil or the webs can also be further processed directly without rolling up. Here the overlay foil is further processed with an internal foil in step 80, FIG. 6. The internal foil is a foil arranged within the card, which is also referred to as core foil. In the case that a component is arranged on the internal foil, e.g. an antenna coil or a chip, this is called an inlay foil.

In step 76, FIG. 6, the internal foil is made available according to the invention in the form of roll goods and is unrolled for the process. In this example the internal foil is opaque. After unwinding the foil, in step 78 an adhesive layer is applied to one side of the internal foil, for example by means of a wide slot nozzle. In step 80 then the internal foil and the overlay foil of step 74 are for example mutually connected or joined in exact register and mutually bonded. The overlay foil is unrolled from the roll again for this purpose and made available to the process in step 80. To the composite or the foil, consisting of the internal foil and the overlay foil, another adhesive layer is applied in step 82, for example on the side of the internal foil. Subsequently, the foil, consisting of the internal foil and the overlay foil, in step 84 is scored for example on that side which is opposite the side that is bonded with itself after the folding, such that after the folding and the bonding there is an outward facing, scored side disposed opposite an inward facing fold edge, about which the folding takes place, and in step 86 is connected and bonded during the folding of the foil in exact register with an inlay foil that is unwound from a roll and made available to the process in step 88. In step 90, a card as data carrier is punched out, e.g. by means of a laser or a rotating punch, from the foil consisting of the transparent overlay foil, the opaque internal foil and the internal foil of step 88. For punching out, any suitable method can be utilized, e.g. also cutting with a water jet. The punched out cards are sorted in step 92 into good cards, i.e. fit for use, and bad cards, i.e. not fit for use, e.g. by means of a gate. The good cards are then sorted in step 94 into magazines in accordance with their variants, e.g. by means of conveyor belts.

Before materials are fed like e.g. in step 80, a punching process can be integrated in order to give a foil to be processed a certain outer shape or in order to punch out areas within the foil.

Before the joining and connecting of at least two foils, here in step 86, heating elements can be disposed for reactivating the adhesive.

When the adhesive is applied, e.g. in step 78 or 82, different adhesives and application thicknesses of adhesive can be present, in order to e.g. compensate uneven areas in the material or in order to bond different materials.

In step 66 or before step 90 an additional printing module, e.g. an inkjet printer with fluorescent ink or normal ink, is possible, which applies a coding per card for tracing or control purposes. After step 90 then a reader reads the coding that is e.g. invisible for the human eye, and sorts the cards e.g. via a gate control, guiding them to certain magazines or boxes.

In step 90 not only the punching out of an outer contour is possible, but also the punching out of any shapes, including gaps within the card.

For production, in principle any width of roll goods is possible, the width being ultimately limited only by the machine on which the method is performed. However, this also means that per foil web e.g. two or three cards are processed and ultimately punched out next to each other in parallel. The machine only has to be adapted accordingly. However, this is of substantial advantage in view of the piece numbers and the speed of card production.

As an alternative to unrolling and making available a foil from a roll like in step 66 or 76, an extrusion installation can be connected directly with the process, such that, e.g. via a wide slot nozzle, foil material specially extruded for a job is fed to the process inline.

In principle, highly different roll goods and materials from a roll can be processed. Therein, at least one foil ply can be processed, e.g. two, three or four plies.

Figure 7:
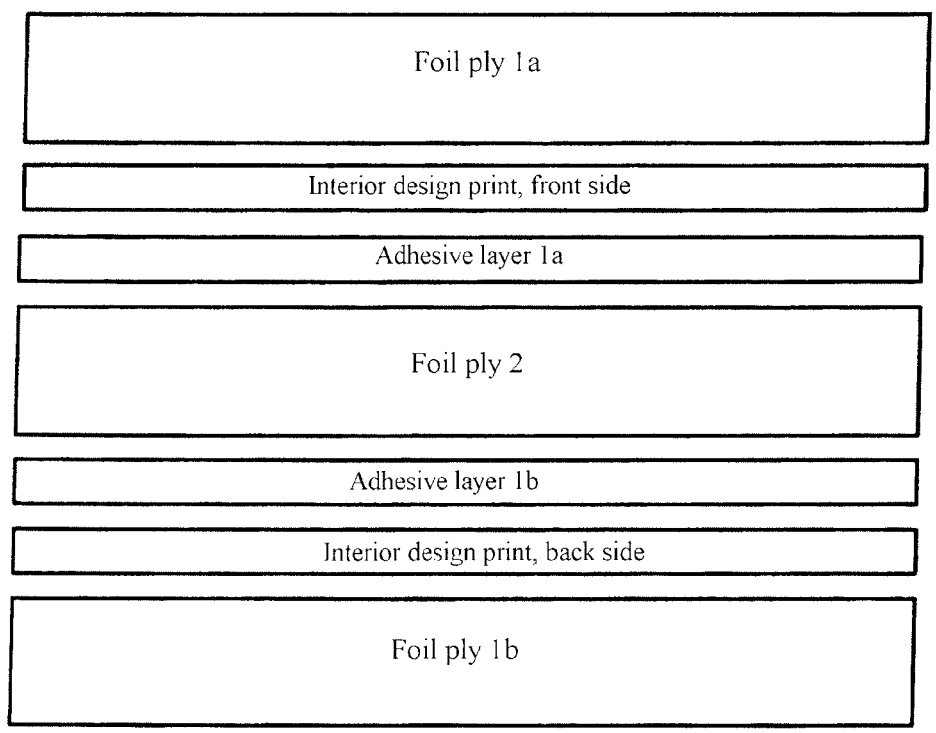
FIGS. 7 to 9 show possible structures of cards according to the invention, consisting of three to five foil layers.
Figure 8:
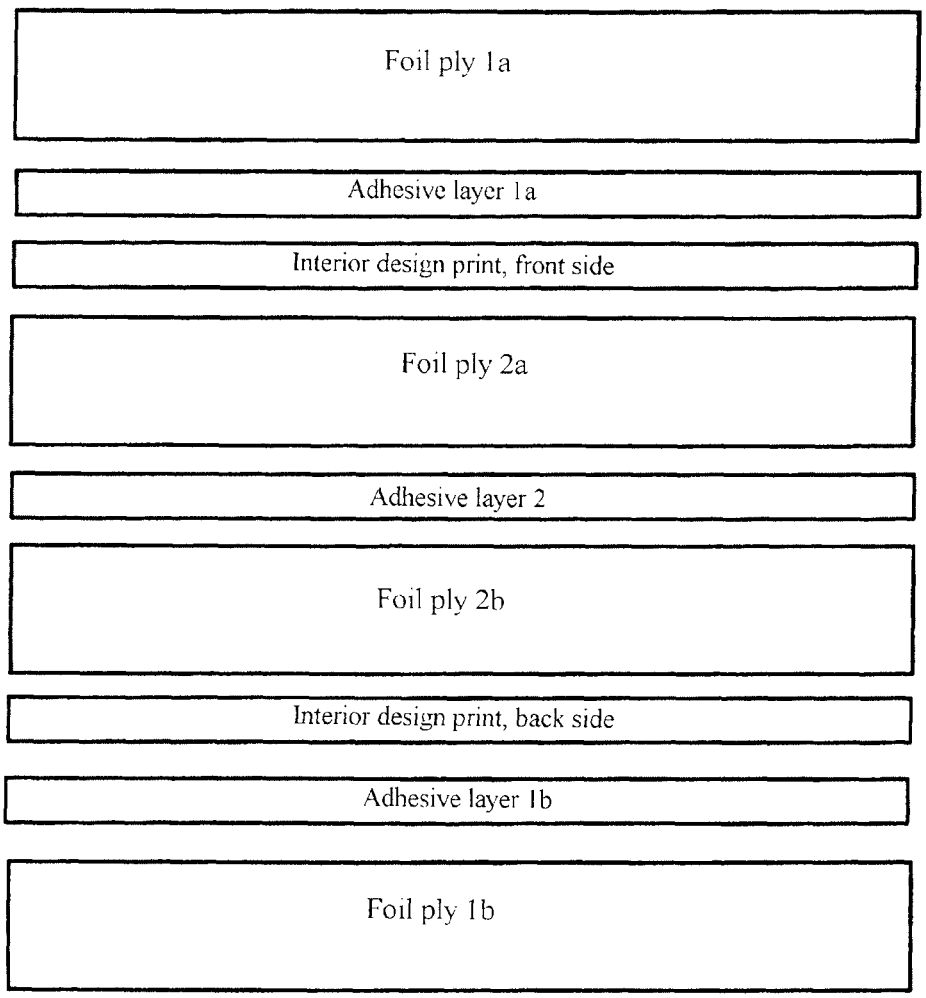
Figure 9:
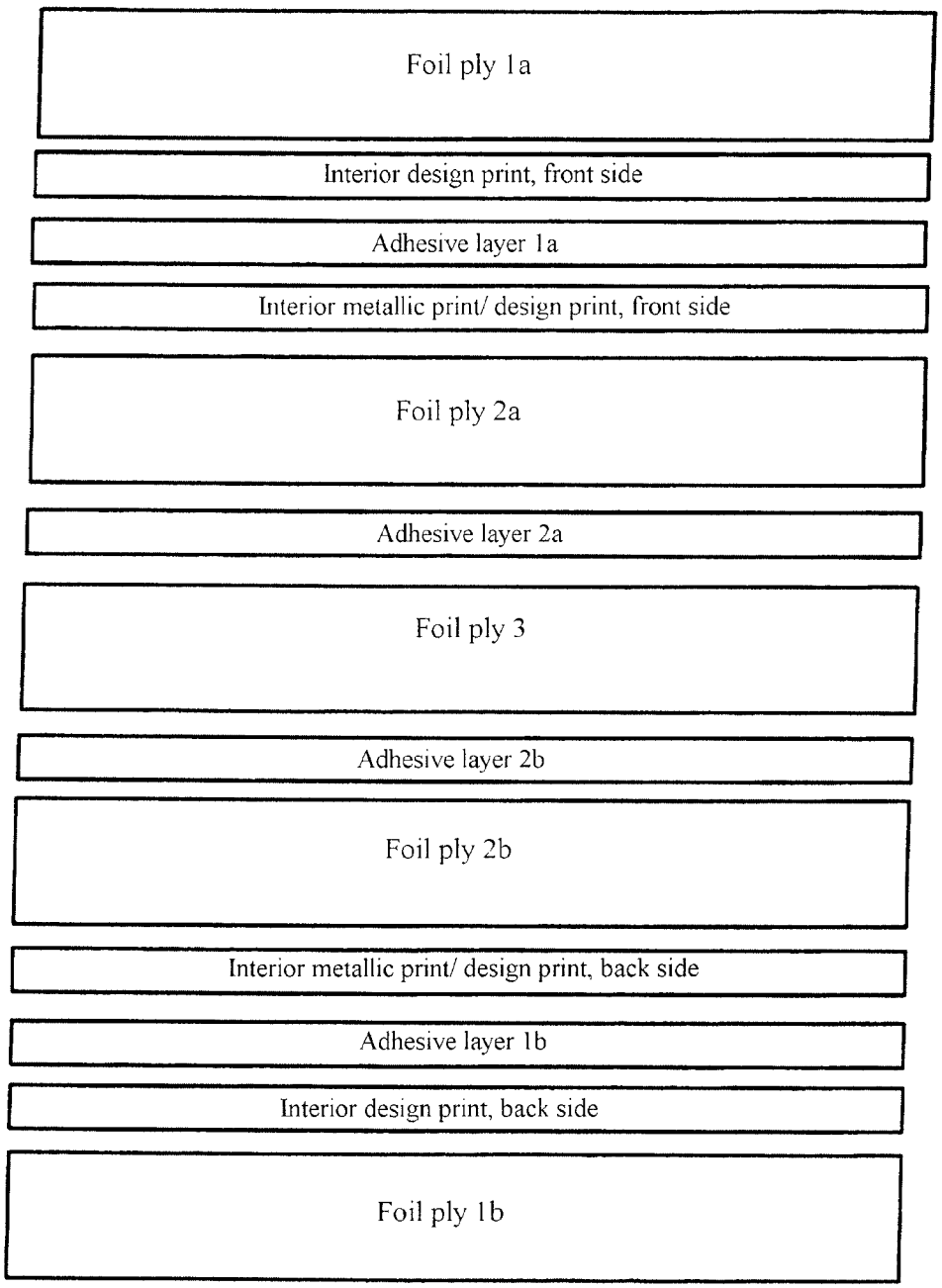

FIGS. 7 to 9 show possible structures of cards according to the invention consisting of three to five foil layers.

FIG. 7 discloses a three-ply structure of a card body consisting of foil ply 1a, 1b and foil ply 2, wherein the foil ply 1 was folded around the foil ply 2. The foil ply 2 here forms an inner foil ply or a so-called middle layer. The foil ply 1 is a transparent foil provided on its inside with respectively a front and a back side of a design print of a card. The two foil plies are mutually connected with the adhesive layers 1a and 1b. The adhesive layers 1a and 1b are likewise an adhesive layer which was folded around the foil ply 2.

FIG. 8 shows a four-ply structure of a card body. FIG. 8 differs from FIG. 7 in that it has two foil plies 2a and 2b arranged within the card. On the surface of and/or within the foil plies 2a and 2b components can be arranged, e.g. antenna coils, chip, etc. A further difference to FIG. 7 is that the inner foil plies 2a and 2b are printed instead of the outer foil. Here the foil ply 2 was folded once and bonded with itself, such that the foil plies 2a and 2b form part of one foil ply 2. The foil ply 1 was folded in exact register around the folded foil ply 2. To the foil plies 1a and 1b the same is applicable as to the foil ply 2.

FIG. 9 discloses a five-layer structure of a card body. The structure has two outer foil plies 1 and 2 and an additional inner foil ply 3 and respectively two printed layers. The foil plies 1a and 1b are one foil ply which was folded. This is applicable correspondingly to the foil plies 2a and 2b. In FIG. 9 both an interior metallic print/design print is arranged on the foil ply 2 and an interior design print with a front and back side in each case is arranged on the foil ply 1.

Figure 10:
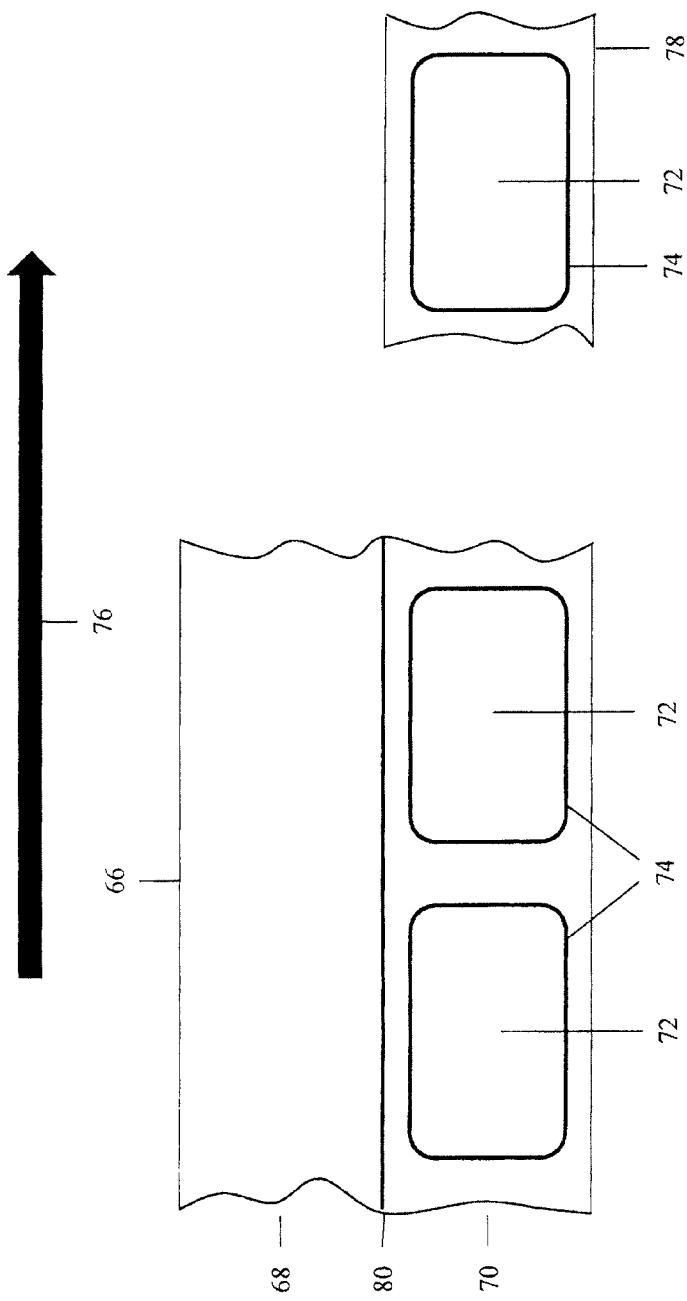
FIG. 10 schematically shows the production method of the invention by the example of producing cards in the ID-1 format.

FIG. 10 schematically shows the production method of the invention by the example of producing cards in the ID-1 format. A foil 66 is fed to the production process from a roll. As described above, the foil 66 is first scored along a fold edge 80 and then an adhesive, not shown in FIG. 10, is applied on one side of the foil 66 to the area 68 or the area 70. Alternatively, it is also possible to first apply the adhesive to the foil 66 and to then score the foil 66. Here the foil 66 is folded once, such that the area 68 along the fold edge 80 is folded onto the area 70. In the area 70 cards 72 are provided in the ID-1 format, which are punched out from the foil 66 along a punch contour 74 at the end of the production process. The foil 66 is moved in a production direction 76 during the production. After folding and bonding of the foil 66 a two-layer composite 78 has been created. The composite 78 can then be further processed by e.g. printing a design on a side of the card 72. A different possibility of further processing of the composite 78 would be e.g. that the cards 72 are punched out from the composite 78 at the end of the production process.

The invention claimed is:

1. An apparatus for producing a portable data carrier, the apparatus comprising:
   a first roller for feeding a foil material,
   a punch tool for creating openings in predetermined areas of the foil material,
   at least one scoring knife configured to score the foil material along a predetermined path,
   a slot nozzle configured to apply an adhesive to the foil material in a predetermined area, and
   a plow folder configured to fold the foil material in at least one direction.

2. The apparatus according to claim 1, the apparatus further comprising a digital printer configured to print on the foil material.

3. The apparatus according to claim 1, further comprising a second roller for rolling the foil material in a roll-to-roll method.

4. The apparatus according to claim 1, wherein the punch tool includes a rotating punch, a water jet, or a laser.

5. The apparatus according to claim 1, wherein the plow folder is configured to fold the foil material in at least two directions.

6. An apparatus for producing a portable data carrier, the apparatus comprising:
   an extrusion installation for providing a foil material,
   a punch tool for creating openings in predetermined areas of the foil material,
   at least one scoring knife configured to score the foil material along a predetermined path,
   a slot nozzle configured to apply an adhesive to the foil material in a predetermined area,
   a plow folder configured to fold the foil material in at least one direction.

7. The apparatus according to claim 6, the apparatus further comprising a digital printer configured to print on the foil material.

8. The apparatus according to claim 6, wherein the punch tool a rotating punch, a water jet, or a laser.

9. The apparatus according to claim 6, wherein the plow folder is configured to fold the foil material in at least two directions.

10. The apparatus according to claim 1, wherein the first roller feeds the foil material, the foil material having an upper face and a lower face, the foil material including a first portion and a second portion, and
    the plow folder folds the foil material such that the upper face of the first portion is directed to the upper face of the second portion when the foil material is in a folded state.

11. The apparatus according to claim 10, wherein the punch tool creates the openings and the plow folder folds the foil material such that the foil material is folded in exact register such that first openings provided in the first portion of the foil material align with predetermined positions in the second portion of the foil material.

12. The apparatus according to claim 11, wherein second openings are provided in the predetermined positions in the second portion of the foil material such that the first openings align with the second openings in exact register.

13. The apparatus according to claim 6, wherein the extrusion installation provides the foil material, the foil material having an upper face and a lower face, the foil material including a first portion and a second portion, and
    the plow folder folds the foil material such that the upper face of the first portion is directed to the upper face of the second portion when the foil material is in a folded state.

14. The apparatus according to claim 13, the punch tool positions the openings, and the plow folder folds the foil material, such that the foil material is folded in exact register such that first openings provided in the first portion of the foil material align with predetermined positions in the second portion of the foil material.

15. The apparatus according to claim 14, wherein second openings are provided in the predetermined positions in the second portion of the foil material such that the first openings align with the second openings in exact register.

16. An apparatus for producing a portable data carrier, the apparatus comprising:
    a foil provider that provides a foil material,
    a puncher that creates openings in predetermined areas of the foil material,
    a scorer that scores the foil material along a predetermined path,
    a nozzle that applies an adhesive to the foil material in a predetermined area, and
    a plow folder that folds fold the foil material in at least one direction.

17. The apparatus according to claim 16, wherein the foil provider provides the foil material, the foil material having an upper face and a lower face, the foil material including a first portion and a second portion, and
    the plow folder folds the foil material such that the upper face of the first portion is directed to the upper face of the second portion when the foil material is in a folded state.

18. The apparatus according to claim 17, the punch tool positions the openings, and the plow folder folds the foil material, such that the foil material is folded in exact register such that first openings provided in the first portion of the foil material align with predetermined positions in the second portion of the foil material.

19. The apparatus according to claim 18, wherein second openings are provided in the predetermined positions in the second portion of the foil material such that the first openings align with the second openings in exact register.

* * * * *